(12) United States Patent
Conrady et al.

(10) Patent No.: US 7,404,335 B2
(45) Date of Patent: Jul. 29, 2008

(54) MAGNETOINDUCTIVE FLOWMETER WITH GALVANIC MEASUREMENT ELECTRODES HAVING A HEAD SECTION OF A NOBLE MATERIAL

(75) Inventors: Wilfried Conrady, Dudenstadt (DE); Dieter Keese, Wahlsburg (DE)

(73) Assignee: ABB Patent GmbH, Ladenburg (DE)

( * ) Notice: Subject to any disclaimer, the term of this patent is extended or adjusted under 35 U.S.C. 154(b) by 34 days.

(21) Appl. No.: 11/472,519

(22) Filed: Jun. 20, 2006

(65) Prior Publication Data

US 2007/0039398 A1 Feb. 22, 2007

(30) Foreign Application Priority Data

Jun. 24, 2005 (DE) .................. 10 2005 029 324

(51) Int. Cl.
*G01F 1/58* (2006.01)
(52) U.S. Cl. ................................... 73/861.12
(58) Field of Classification Search .............. 73/861.12, 73/861.15
See application file for complete search history.

(56) References Cited

U.S. PATENT DOCUMENTS

| | | | | |
|---|---|---|---|---|
| 3,171,990 A | * | 3/1965 | Bennett | 73/861.11 |
| 3,177,709 A | | 4/1965 | Fischer | |
| 3,358,075 A | * | 12/1967 | Hunt | 73/861.12 |
| 3,746,896 A | | 7/1973 | Gruner | |
| 3,750,468 A | * | 8/1973 | Grauer | 73/861.12 |
| 3,786,680 A | * | 1/1974 | Wyatt et al. | 73/861.12 |
| 4,388,834 A | | 6/1983 | Schmoock | |
| 4,507,975 A | * | 4/1985 | Bittner et al. | 73/861.12 |
| 4,517,846 A | * | 5/1985 | Harrison et al. | 73/861.12 |
| 4,773,275 A | * | 9/1988 | Kalinoski | 73/861.12 |
| 4,912,838 A | * | 4/1990 | Goto et al. | 73/861.12 |
| 5,095,759 A | * | 3/1992 | Mizuhara et al. | 73/861.12 |

(Continued)

FOREIGN PATENT DOCUMENTS

DE 2119705 10/1972

(Continued)

*Primary Examiner*—Harshad Patel
(74) *Attorney, Agent, or Firm*—Paul R. Katterle; Michael M. Rickin

(57) ABSTRACT

A magnetoinductive flowmeter having a measurement tube (1), through which a flowable medium (3) flows, with a magnet unit (4a, 4b) which is arranged on the outside of the measurement tube (1) and produces a magnetic field which is oriented substantially perpendicular to the direction of flow of the flowable medium (3), with at least two measurement electrodes (5a, 5b) which are inserted opposite one another in the wall of the measurement tube (1) such that they are electrically insulated being provided for detecting the measurement voltage which is induced through the flowable medium (3) in the magnetic field and each coming into contact with the flowable medium (3) by means of at least one end face (9), so that the measurement electrodes (5a, 5b) operate in the manner of galvanic electrodes, wherein each measurement electrode (5) is designed in a divided manner and comprises a head section (8) which is composed of a noble, low-corrosion material and also a shaft section (7) which is composed of a base, electrically conductive material, with the measurement electrode (5) making contact with the flowable medium (3) by means of the head section (8) and being mechanically fixed in the measurement tube (1) and/or electrically connected to the outside by means of the shaft section (7).

13 Claims, 1 Drawing Sheet

U.S. PATENT DOCUMENTS

Figure 1:
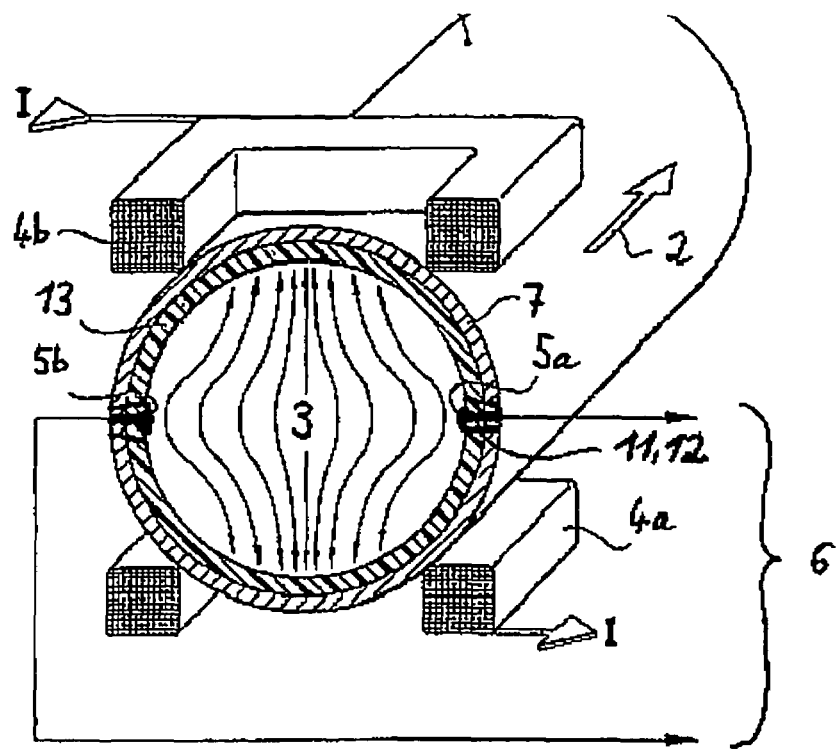

| | | | | |
|---|---|---|---|---|
| 5,269,191 A | * | 12/1993 | Wada | 73/861.12 |
| 6,178,826 B1 | * | 1/2001 | Graf et al. | 73/861.12 |
| 2006/0236780 A1 | * | 10/2006 | Hofmann | 73/861.12 |
| 2007/0163359 A1 | | 7/2007 | Nielsen | |

FOREIGN PATENT DOCUMENTS

| | | |
|---|---|---|
| DE | 10312824 | 12/2004 |
| GB | 899095 | 6/1962 |

* cited by examiner

MAGNETOINDUCTIVE FLOWMETER WITH GALVANIC MEASUREMENT ELECTRODES HAVING A HEAD SECTION OF A NOBLE MATERIAL

This application claims priority from German Application DE 10 2005 029 324.7 filed on Jun. 24, 2005 the contents of which are relied upon and incorporated herein by reference in their entirety, and the benefit of priority under 35 U.S.C. 119 is hereby claimed.

The invention relates to a magnetoinductive flowmeter having a measurement tube, through which a flowable medium flows, and with a magnet unit which is arranged on the outside of the measurement tube and produces a magnetic field which is oriented substantially perpendicular to the direction of flow of the flowable medium, with at least two measurement electrodes which are inserted opposite one another in the wall of the measurement tube such that they are electrically insulated being provided for detecting the measurement voltage which is induced through the flowable medium in the magnetic field and each coming into contact with the flowable medium by means of at least one end face, so that the measurement electrodes operate in the manner of galvanic electrodes.

The field of use of a magnetoinductive flowmeter of this type extends to determining volumetric or mass flows of a flowable medium, such as liquids, slurries, pastes and the like. In this case, the flowable medium has to have a specific minimum electrical conductivity in order for the measurement method to work. Flowmeters of the type of interest here are distinguished by very accurate measurement results, with no loss of pressure being caused in the pipeline system by the measurement. In addition, magnetoinductive flowmeters do not have any moving components or components which protrude into the measurement tube, which components would thereby be particularly susceptible to wear. The flowmeters of interest here are predominantly used in the chemical, pharmaceutical and cosmetics industries and also in communal water and wastewater management and in the food industry.

The measurement method is based on Faraday's law of induction. This natural law states that a voltage is induced in a conductor which moves in a magnetic field. When this natural law is utilized in measurement technology, the electrically conductive medium flows through a measurement tube in which a magnetic field is generated perpendicular to the direction of flow. The voltage induced in the medium as a result of this is tapped off by an electrode arrangement. The electrode arrangement used is usually two measurement electrodes which are inserted opposite one another in the measurement tube. Since the measurement voltage obtained in this way is proportional to the average flow rate of the flowing medium, the volumetric flow of the medium can be established from this. The mass flow of said medium can be determined by taking into account the density of the flowing medium.

DE 101 28 607 A1 discloses a generic galvanic measurement electrode—that is to say a measurement electrode which touches the measurement substance—which has a U-shaped longitudinal section and is passed through the wall of a measurement tube in order for that side which protrudes into the measurement tube to come into contact with the measurement substance which is flowing past. The throughflow-dependent effect explained above can then be measured in a magnetoinductive manner by means of this galvanic connection, and can then be converted into a throughflow value.

On account of the high conductivity required, measurement electrodes of this type are usually composed of materials which on the other hand cannot permanently withstand chemically abrasive influences of the measurement substance. As a result of the destruction of the electrodes by mechanical or chemical wear, there is a risk of the flowmeter failing, so that the measurement substance can cause further damage to equipment and the environment. Furthermore, in the case of explosive substances, there is of course an acute risk of explosion if these explosive substances are able to escape through the wall of the measurement tube through worn-away electrodes or electron apertures. In order to eliminate these problems, this prior art proposes forming the measurement electrode from an outer casing electrode with a second safety electrode which is arranged in said casing electrode such that it is insulated. The measurement electrode itself is in the form of a hollow body with a thick wall and has a second safety electrode which is insulated from the measurement electrode placed inside.

If the abrasive action on the measurement electrode over time then leads to the electrode material actually being worn away, the measurement substance activates the inner safety electrode at that instant at which said outer casing electrode, which is in the form of a hollow body, is completely eroded, and this can be determined immediately by means of corresponding evaluation electronics.

This technical solution therefore provides a safety function. However, this does not change anything about the fact that the electrode itself has to be produced from a material which is as durable as possible, in order to achieve as long a service life as possible when used in conjunction with abrasive or chemically aggressive measurement substances. The entire measurement electrode is therefore usually produced from platinum or another suitable noble metal.

The disadvantages of this are the extremely high material costs and the low mechanical strength of the material.

The object of the present invention is therefore to provide a magnetoinductive flowmeter whose measurement electrodes firstly require lower outlay on material and secondly can be installed in a measurement tube in a stable manner.

This object is achieved on the basis of a magnetoinductive flowmeter as claimed in the preamble of claim 1 in conjunction with the characterizing features of said claim. Further advantageous refinements are cited in the other dependent claims.

The invention includes the technical teaching that each measurement electrode is designed in a divided manner and comprises a head section which is composed of a -noble, low-corrosion material and also a shaft section which is composed of a base, electrically conductive material, with the measurement electrode making contact with the flowable medium by means of the head section and being mechanically fixed in the measurement tube and/or electrically connected to the outside by means of the shaft section.

The advantage of the inventive solution is, in particular, that the measurement electrode is designed in a modular fashion in accordance with the technical functionality required of it. Since only the head section comes into contact with the flowable medium, only this section of the measurement electrode needs to be produced from the costly noble material. In contrast, the function of the electrode shaft preferably involves mechanically fixing the entire measurement electrode in the measurement tube. From an electrical point of view, the shaft section only needs to transmit the electrical signal to the outside. These requirements result in the finding that the electrode shaft can be formed from an entirely different material. One suitable material is, for example, stainless steel, which is distinguished by high mechanical stability, electrical conductivity, and a reasonable material price. Since the stability of stainless steel is higher than the mechanical stability of those noble materials from which a measurement electrode is usually composed, the inventive measurement electrode can also be installed in a measurement tube in a particularly stable manner.

A noble metal or a noble-metal alloy with platinum, gold or tantalum as the main constituents is preferably used as the noble material of the head section of the measurement electrode. A base material which is suitable for the shaft section is preferably a metal or a metal alloy with iron, zinc or copper as the main constituent. However, a stainless steel is particularly preferably suitable for producing the shaft section.

According to a further measure which improves the invention, the head section of the measurement electrode is substantially in the form of a mushroom. The concave surface of the head section makes reliable contact with the flowable medium, whereas the mechanical connection to the shaft section which adjoins the mushroom-like head section is produced by means of the stem region of said mushroom-like head section.

The head section of the measurement electrode can be fixed to the shaft section in a variety of ways. A screw connection is preferably used at this point. For this purpose, it is necessary to create an external thread in the stem region of the head section or at the corresponding end of the shaft section, this external thread engaging in a corresponding threaded base hole in the shaft section or the head section. Particularly stable fixing can be achieved on account of the interlocking and force-fitting properties of such a screw connection. Furthermore, the head section can be replaced after a wear limit is reached on account of the fact that this connection is releasable; in contrast, the shaft section can be used further. This type of connection therefore proves to be particularly easy to fit and repair. However, the connection between the head section and the measurement electrode may also be permanent, for example in the form of a soldered connection, that is to say cohesive. However, it is also feasible to produce the connection point in the form of a press-in connection, that is to say in a purely force-fitting manner. The force-fitting connection may be made by inserting the stem region on the mushroom-like head section into a corresponding base hole in the end face of the shaft section for example, with the two components being compressed on account of the shaft section being crimped radially inward in the region of the base hole. It is of course also possible to combine some of the preferred types of connection cited above with one another. It is therefore feasible to secure a releasable screw connection against automatically loosening using an adhesive.

The distal end of the preferably cylindrical shaft section of the measurement electrode can be routed to the signal input of a control unit via a signal line in order to create an electrical connection to the outside. The signal line is preferably fixed to the end of the shaft section by soldiering. However, it is also feasible to provide the end of the cylindrical shaft section with a screw clamp and therefore make installation easier for the purpose of fixing the signal line to said shaft section.

According to another advantageous development of the inventive measurement electrode, said electrode may also be equipped with means for providing electrical screening from the surroundings. Such means for providing electrical screening are required particularly in surroundings with electromagnetic stray fields, in order to prevent corruption of the voltage potential which is tapped off by means of the measurement electrodes. Variants of such means for providing electrical screening can be found in the general prior art for measurement electrodes and be applied to the inventive solution.

The inventive measurement electrode is fixed in a corresponding recess in the wall of the measurement tube by means of its shaft section. It is also proposed that the head section of the measurement electrode be arranged at least partially in a corresponding recess in the measurement tube, which recess may be formed by a step of a relatively large diameter in the aperture in the measurement tube. As a result of this, the inventive measurement electrode is held more securely in the measurement tube overall and protrudes only slightly into the interior of the measurement tube, and this is favorable for the flow dynamics.

According to another measure which improves the invention, provision is made for an electrical insulation layer to be arranged between the measurement electrode and the metallic measurement tube, this insulation layer being composed of an electrically insulating ceramic or plastic material. The insulation layer is needed so that the measurement electrode does not come into electrical contact with the metallic measurement tube which is usually connected to ground. In this case, the inner surface of the metallic measurement tube as a whole may be provided with an electrical insulation lining which continues the electrical insulation layer and is preferably composed of the same material as the electrical insulation layer around the management electrode.

Figure 2:
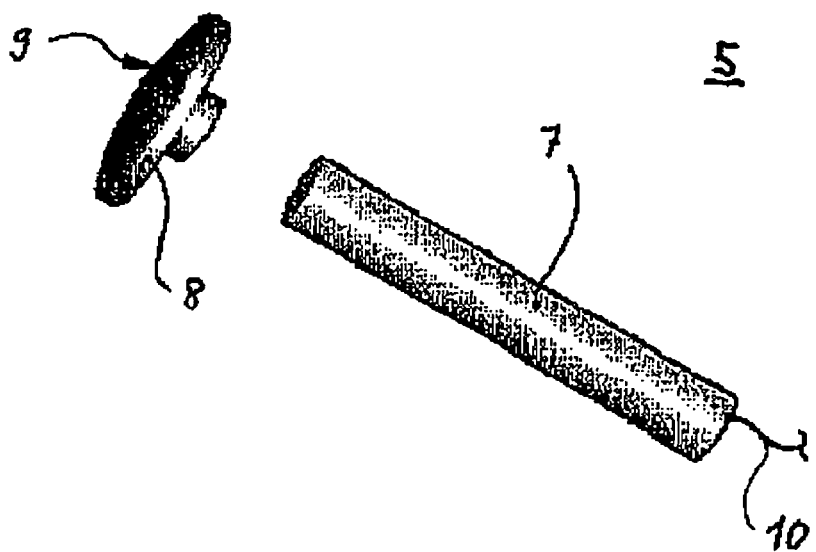

Further measures which improve the invention are described in greater detail below together with the description of a preferred exemplary embodiment of the invention with reference to the figures, in which FIG. 1 shows a longitudinal section through a schematic illustration of a magnetoinductive flowmeter, and FIG. 2 shows a detail of an exploded illustration of a measurement electrode which is used in the flowmeter from FIG. 1.

According to FIG. 1, a magnetoinductive flowmeter has a measurement tube 1 through which a flowable medium 3 flows in the direction 2 of flow. A magnet unit 4a and 4b is arranged on the outside of the measurement tube 1. The magnet unit 4a, 4b produces a magnetic field which is oriented substantially perpendicular to the direction 2 of flow of the conductive medium 3 to be measured. The magnet unit 4a, 4b interacts with electrical measurement electrodes 5a and 5b which are inserted into the measurement tube 1 but insulated from the latter. The measurement electrodes 5a and 5b electrically tap off the measurement voltage which is generated by induction in the conductive medium 3, from which a downstream control unit 6 determines the volumetric flow of the flowable medium 3 through the measurement tube 1.

A head section 8 of the measurement electrode 5 engages partially in a corresponding recess 11 in the measurement tube 1. An electrical insulation layer 12, which is composed of plastic in this case, is provided at the contact point between the measurement electrode 5 and the metallic measurement tube 1. The inner surface of the metallic measurement tube 1 is likewise provided with an electrical insulation lining 13 which is composed of plastic and continues the electrical insulation layer 12.

According to FIG. 2, each measurement electrode 5 is designed in a divided manner and comprises a shaft section 7 which is composed of a base, electrically conductive material, in this case of stainless steel, and also a head section 8 which is composed of a noble, low-corrosion material, in this case platinum.

The head section 8 of the measurement electrode 5 is substantially in the form of a mushroom and is in contact with the flowable medium—not shown further—by means of an end face 9 which is curved in a concave manner. In this embodiment, the head section 8 is fixed to one end of the shaft section 7 in a cohesive manner by means of a soldered connection and thus permanently. The distal end of the cylindrical shaft section 7 of the measurement electrode 5 has a signal line 10, which is likewise fixed to said shaft section by soldering, in order to create an electrical connection to the outside.

The invention is not restricted to the exemplary embodiment described above. Instead, it is feasible to make modifications to this exemplary embodiment which are also covered by the scope of protection of the following claims. Therefore, it is also possible, for example, to form the head section of the measurement electrode 5 from a different noble, low-corrosion material. The type of material naturally depends on the corrosiveness of the flowable medium 3. In an analogous manner, a different metal may also be used as the material for the shaft section, as long as this metal is sufficiently electrically conductive and meets the requirements for adequate mechanical stability. Finally, it is also possible for the connection point between the head section and the shaft section of the inventive measurement electrode to be releasable or permanent, as long as a reliable mechanical and electrical connection which meets the special requirements for the intended use is ensured.

LIST OF REFERENCE SYMBOLS

1 Measurement tube
2 Direction of flow
3 Flowable medium
4 Magnet unit
5 Measurement electrode
6 Control unit
7 Shaft section
8 Head section
9 End face
10 Signal line
11 Recess
12 Insulation layer
13 Insulation lining

The invention claimed is:

1. A magnetoinductive flowmeter comprising:
   a measurement tube through which a flowable medium can flow, said measurement tube having a wall;
   a magnet unit which is arranged on the outside of said measurement tube;
   at least two measurement electrodes inserted opposite one another in said measurement tube wall, each of said measurement electrodes comprising:
   a head section for making contact with said flowable medium and composed of a low-corrosion noble material, the noble material comprising platinum, gold or tantalum; and
   a shaft section fixed to the head section and composed of an electrically conductive base material comprising iron, zinc or copper, said shaft section mechanically fixing said measurement electrode in said measurement tube wall, wherein said measurement electrode makes contact with the flowable medium only with said head section composed of the noble material.

2. The magnetoinductive flowmeter as claimed in claim 1, wherein the noble material of the head section is a noble-metal alloy with platinum, gold or tantalum as the main constituent.

3. The magnetoinductive flowmeter as claimed in claim 1, wherein the base material of the shaft section is a metal alloy with iron, zinc or copper as the main constituent.

4. The magnetoinductive flowmeter as claimed in claim 3, wherein the base material of the shaft section is stainless steel.

5. The magnetoinductive flowmeter as claimed in claim 1, wherein the head section of the measurement electrode is substantially in the form of a mushroom.

6. The magnetoinductive flowmeter as claimed in claim 1, wherein the head section of the measurement electrode is releasably fixed to the shaft section.

7. The magnetoinductive flowmeter as claimed in claim 1, wherein the head section of the measurement electrode is permanently fixed to the shaft section.

8. The magnetoinductive flowmeter as claimed in claim 7, wherein said permanent fixing of the head section of the measurement electrode to the shaft section is in a force-fitting manner by means of a press-in connection.

9. The magnetoinductive flowmeter as claimed in claim 1, wherein the distal end of the shaft section of the measurement electrode is connected to the signal input of a control unit by a signal line in order to create an electrical connection to the outside.

10. The magnetoinductive flowmeter as claimed in claim 1, wherein the head section of the measurement electrode is arranged at least partially in a corresponding recess in the measurement tube.

11. The magnetoinductive flowmeter as claimed in claim 1, wherein said measurement tube is metallic and an electrical insulation layer composed of an electrically insulating ceramic or plastic material is arranged between the measurement electrode and the metallic measurement.

12. The magnetoinductive flowmeter as claimed in claim 11, wherein the inner surface of the metallic measurement tube is provided with an electrical insulation lining which continues the electrical insulation layer.

13. The magnetoinductive flowmeter as claimed in claim 1, wherein the noble material is different from the base material.

* * * * *